United States Patent
McMullen et al.

(10) Patent No.: US 6,700,258 B2
(45) Date of Patent: Mar. 2, 2004

(54) MAGNETIC THRUST BEARING WITH PERMANENT BIAS FLUX

(75) Inventors: Patrick T. McMullen, Long Beach, CA (US); Co Si Huynh, Alhambra, CA (US)

(73) Assignee: Calnetix, Torrance, CA (US)

(*) Notice: Subject to any disclaimer, the term of this patent is extended or adjusted under 35 U.S.C. 154(b) by 0 days.

(21) Appl. No.: 09/865,015

(22) Filed: May 23, 2001

(65) Prior Publication Data

US 2002/0175578 A1 Nov. 28, 2002

(51) Int. Cl.[7] .................................................. H02K 7/09
(52) U.S. Cl. ....................................................... 310/90.5
(58) Field of Search ........................................ 310/90.5

(56) References Cited

U.S. PATENT DOCUMENTS

| | | | |
|---|---|---|---|
| 30,471 A | * 10/1860 | Kanebako | .................... 310/12 |
| 3,865,442 A | 2/1975 | Studer | |
| 3,890,019 A | 6/1975 | Boden et al. | |
| 3,937,148 A | 2/1976 | Simpson | |
| 3,955,858 A | 5/1976 | Poubeau | |
| 5,003,211 A | 3/1991 | Groom | |
| 5,250,865 A | * 10/1993 | Meeks | ........................ 310/90.5 |
| 5,315,197 A | * 5/1994 | Meeks et al. | .............. 310/90.5 |
| 5,319,275 A | * 6/1994 | Tozoni | ....................... 310/90.5 |
| 5,514,924 A | * 5/1996 | Mcmullen et al. | ......... 310/90.5 |
| 5,804,899 A | 9/1998 | Jamain et al. | |

\* cited by examiner

*Primary Examiner*—Thanh Lam
(74) *Attorney, Agent, or Firm*—Fulbright & Jaworski LLP (57) ABSTRACT

A magnetic thrust bearing having a high speed rotation capability and low cost construction. The magnetic thrust bearing has permanent magnets to provide bias flux. The magnetic circuits of the control flux and bias fluxes are substantially non-coincident, which allows for a low reluctance and efficient path for the control flux. The flux paths of the permanent magnets are completely defined with minimized airgaps for achieving higher forces and efficiency and very low control currents produce extremely large forces. No radially magnetized permanent magnets are required and no permanent magnets are attached to the rotor.

9 Claims, 9 Drawing Sheets

MAGNETIC THRUST BEARING WITH PERMANENT BIAS FLUX

BACKGROUND OF THE INVENTION

1. Field of the Invention

This invention relates to a magnetic thrust bearing and more particularly a magnetic thrust bearing that uses permanent bias flux with a simplified construction to allow for highly efficient force generation, high speed rotation capability and low cost construction.

2. Description of Related Art

Magnetic thrust bearings were originally constructed by using a single ferromagnetic disk attached to a rotating shaft. The thrust disk is then acted upon by electromagnets with a C-shaped cross-section located above and below the disk. This offers a very simple and low cost construction but has a very low efficiency along with requiring complex nonlinear control.

Figure 1:
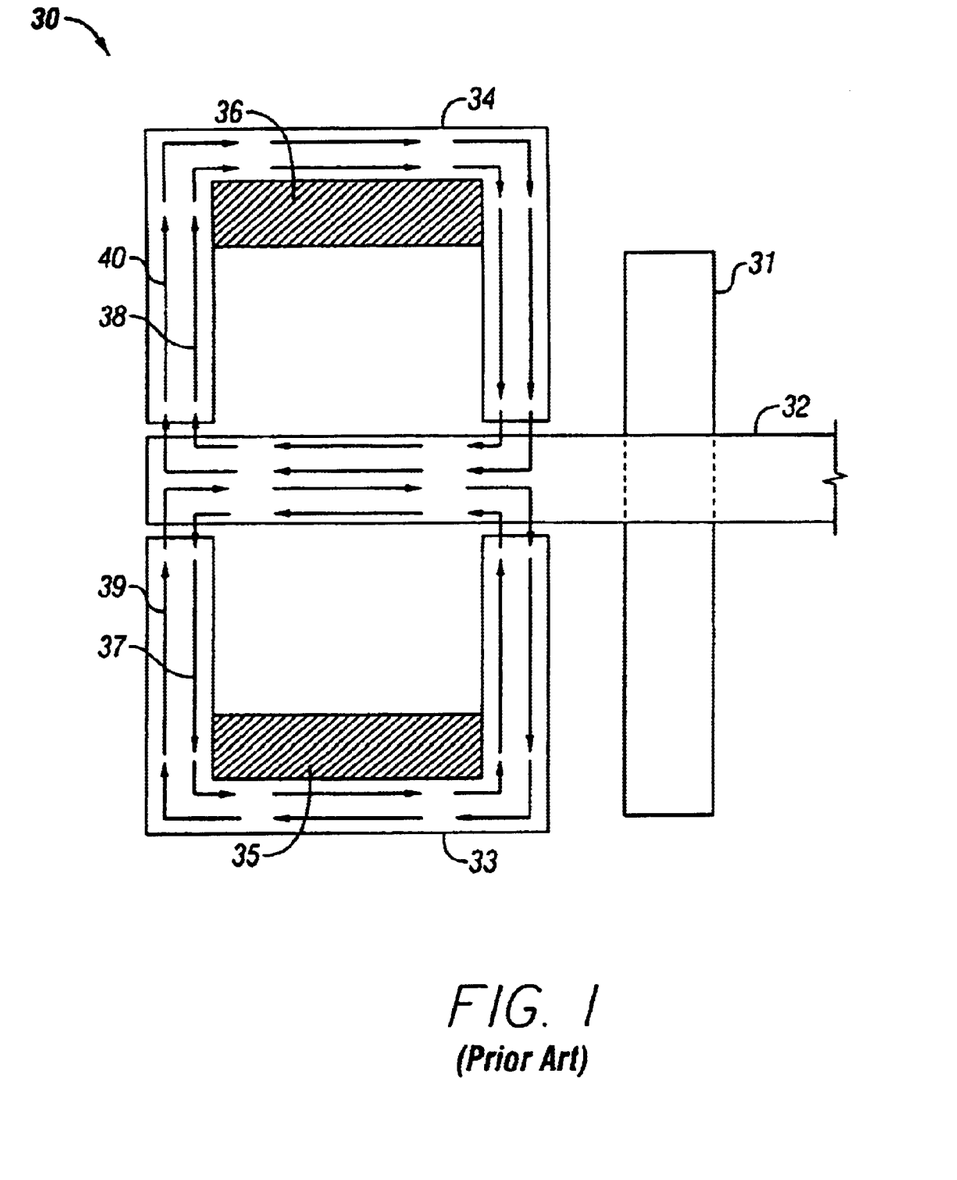
FIG. 1 is a schematic of a prior art magnetic bearing configuration using bias flux generated from electromagnets.

The next advancement uses the same mechanical construction, however the electronics employs a large constant current to each coil to generate a bias flux. A small control current is added on top of the bias currents to control the bearing. The result of using a bias flux is simplified control because the relationship of force to control current becomes linearized. Linearization is provided because the force is proportional to the square of the flux density. This functions by adding the control flux to one coil's bias flux and at the same time subtracting the same control flux from the other. The force generated is then directly related to the difference of the squares of the net top and net bottom fluxes, and this varies linearly with control current. The drawback of this bearing configuration is the steady-state electrical inefficiency from having to electrically maintain the bias currents. FIG. 1 shows the configuration 30. The thrust disk 32 is attached to the shaft 31 and acted upon by an upper C-core ring 34 and a lower C-core ring 33. An upper coil 36 and lower coil 35 are used to generate magnetic flux. A bias current is applied to each coil 35, 36 to generate bias fluxes 37 and 38. A control current is then applied in superposition to the bias currents in each coil 35, 36 which generates control fluxes 39 and 40. In FIG. 1, the upper control and bias fluxes 40, 38 add and the lower control and bias fluxes 39, 37 subtract. The net result is force exerted upward on the disk 32 that varies linearly with the control current. A non-dimensionalized example on the linearization is as follows. If the bias fluxes have an arbitrary value of 5 and a control flux is superposed with a value of 1, the flux on the top side of the disk becomes 6 and on the bottom side becomes 4. The net force is then ($6^2-4^2$) or 20. Because of the bias flux, the relation of force to control current becomes both linearized and amplified. With a control flux of 2, the resulting force would then be double, 40. Without the bias flux, control flux would only be applied to one core at a time to generate force and a control flux of 1 and 2 would result in forces of only 2 and 4. Two amplifiers would also be required for operation.

Figure 2:
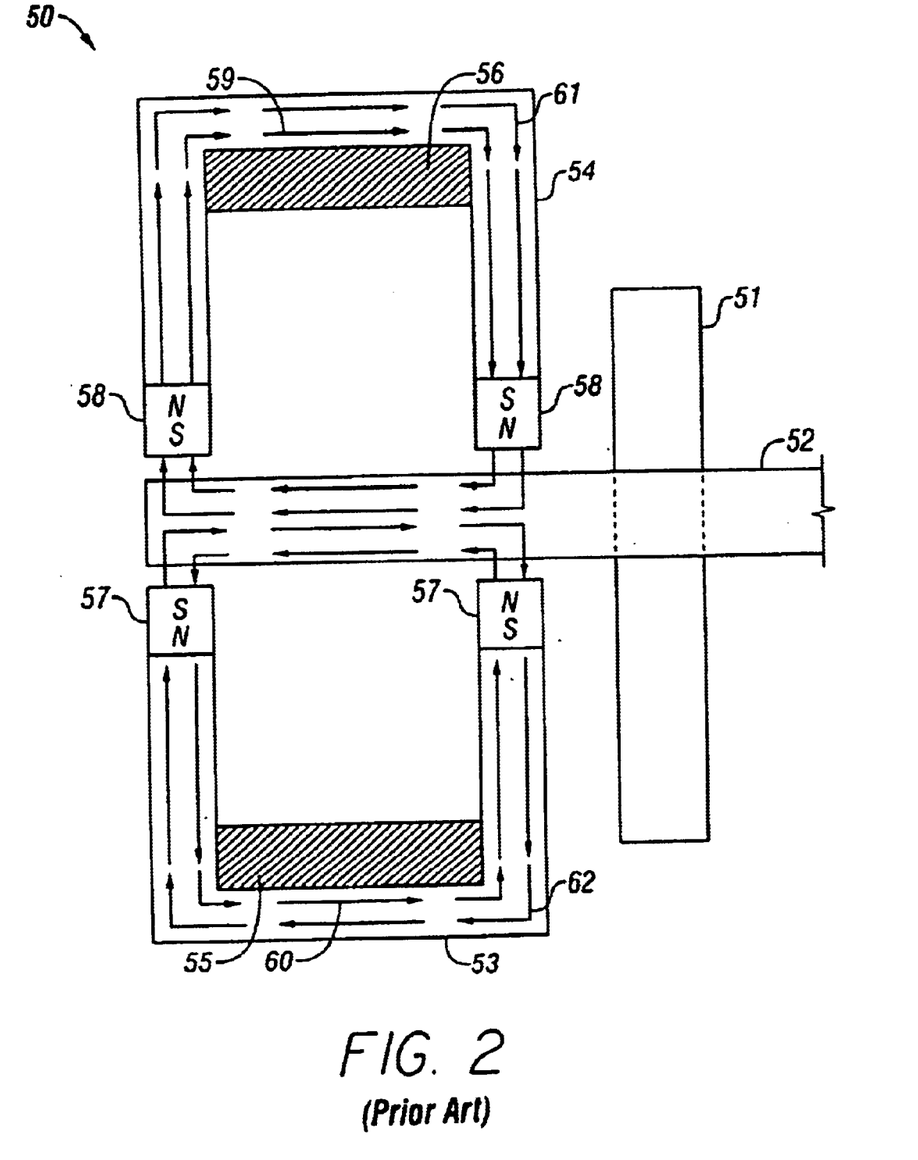
FIG. 2 is a schematic of a prior art magnetic bearing configuration using permanent magnets in series with electromagnets for generating bias flux.

An improved design of magnetic thrust bearings places permanent magnets in series with the electromagnets so that the bias flux is generated without use of electric power. U.S. Pat. Nos. 3,937,148 and 5,003,211 show variations using this concept. This design increases the steady-state electrical efficiency, however the permeability of high energy permanent magnets is very low. Therefore, the electromagnets require much more control current to generate the same control flux because of the higher reluctance of the magnetic circuits. FIG. 2 shows the configuration 50. The thrust disk 52 is attached to the shaft 51 and is acted upon by an upper C-core ring 54 and a lower C-core ring 53. Permanent magnets 57 and 58 generate the bias fluxes 59 and 60. Opposed control currents in coils 55 and 56 generate the control fluxes 61 and 62. As before, the control and bias fluxes are additive in one core 54 and subtractive in the other 53, resulting in an upward force on the disk 32. Unfortunately, magnets 57 and 58 have permeability comparable to an airgap. Therefore, the required control current to generate the equivalent control fluxes 61 and 62 as in the configuration 30 control fluxes 39 and 40 is much higher.

Figure 3:
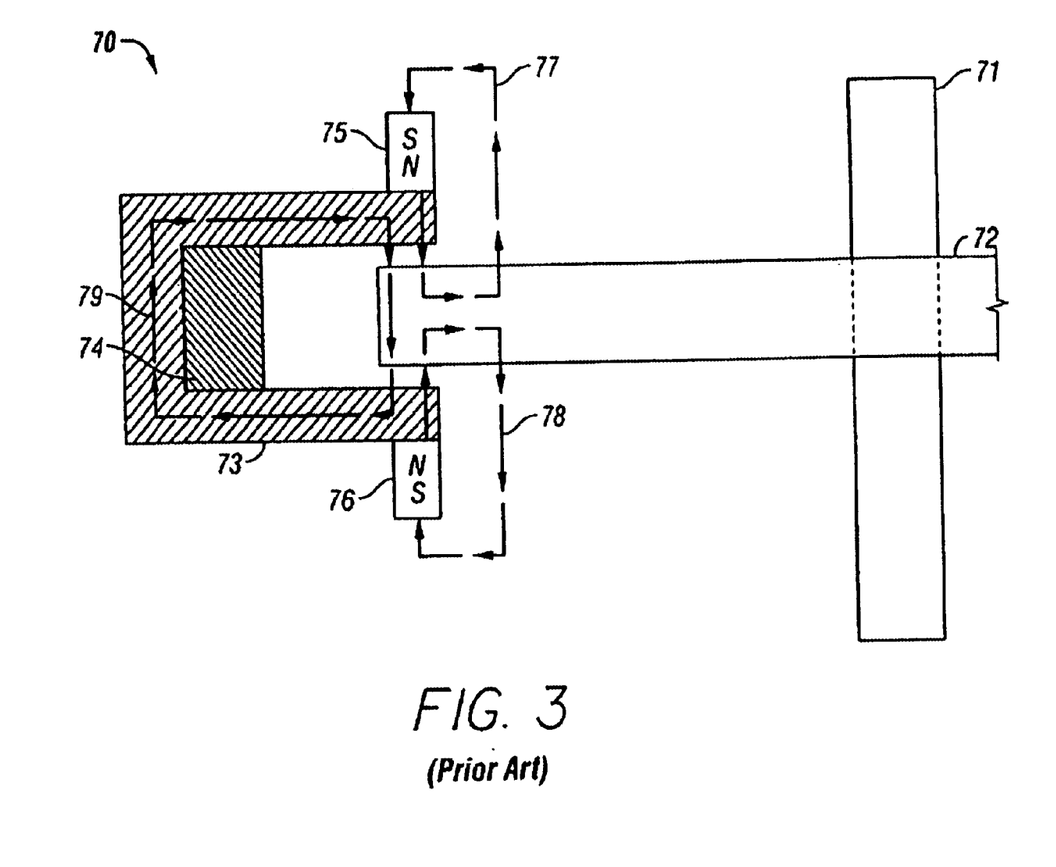
FIG. 3 is a schematic of a prior art magnetic bearing using permanent magnets for generation of bias flux with a non-coincident electromagnetic flux path and ill-defined permanent magnet flux paths.

A further improvement is to use permanent magnets for generating bias flux but the permanent magnet flux paths are made non-coincident with the path of the electromagnet flux. The permanent magnets are not in series with the electromagnets but instead share only a portion of the same paths that include the airgaps. The result is a greatly improved design that allows for both linear and highly efficient control. U.S. Pat. No. 3,890,019 is one configuration and this is shown in FIG. 3. The thrust disk 72 is attached to the shaft 71 and is acted upon by a single external C-core yoke ring 73. A single coil 74 is used to generate the control flux 79. Permanent magnets 75 and 76 generate the bias fluxes 77 and 78. Superposition of the control and bias fluxes 79,77,78 cause an upward force on the disk 72. The only drawback with this configuration is that it does not achieve the highest possible force capability or efficiency because of ill-defined large airgaps in the permanent magnetic flux paths 77 and 78.

Figure 4:
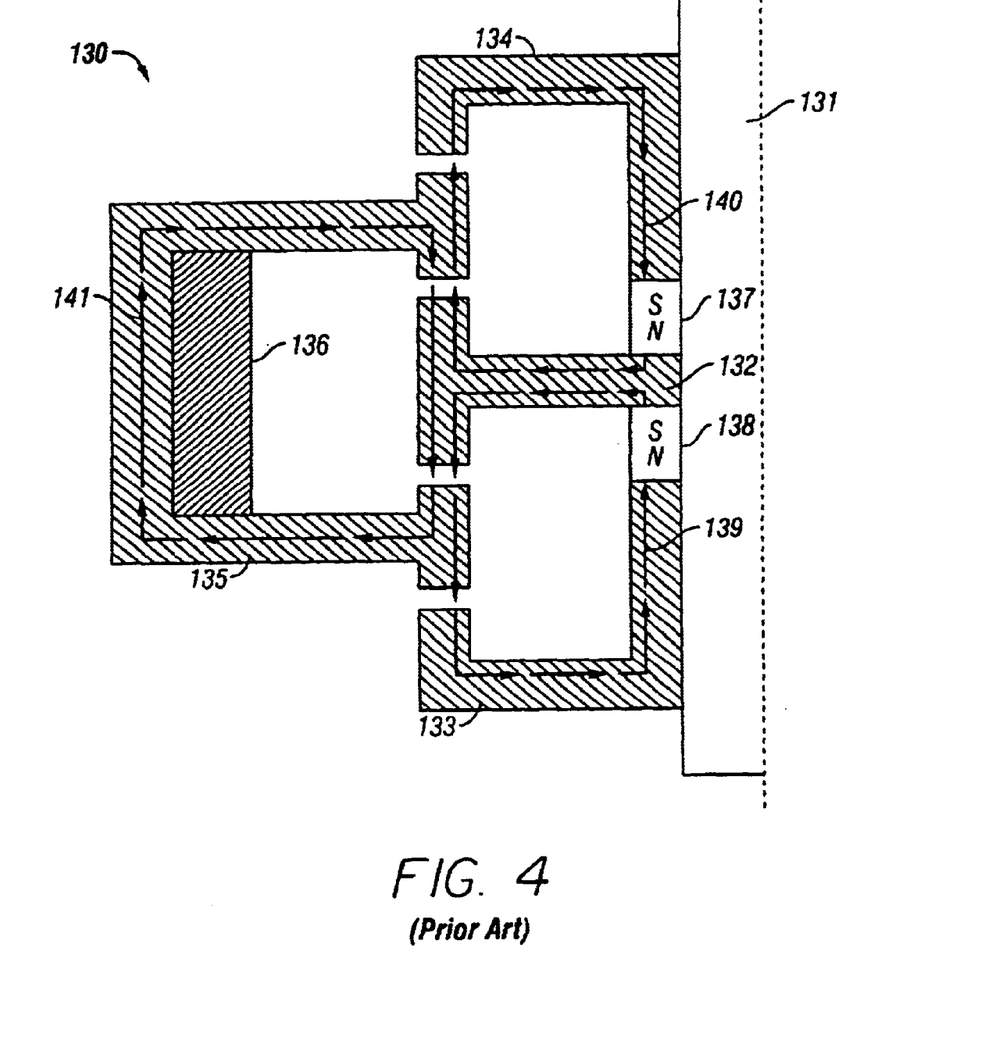
FIG. 4 is a schematic of a prior art magnetic bearing using permanent magnets for generation of bias flux with a non-coincident electromagnetic flux path and three rotating ferromagnetic thrust disks.

U.S. Pat. No. 3,865,442 is a more efficient design using the same concept of non-coincident control and bias flux paths. FIG. 4 shows the configuration 130. Three thrust disks 132, 133, 134 are attached to the shaft 131. The thrust disks 132, 133, 134 are acted upon by a single external C-core ring 135 with a control coil 136 for producing control flux 141. Permanent magnets 137 and 138 attached to the shaft 131 generate the bias fluxes 139 and 140. The drawbacks of this design are the use of rotating permanent magnets, which limit the high speed rotation capability due to their low strength, and the complexity. The use of three thrust disks is also undesirable.

Figure 5:
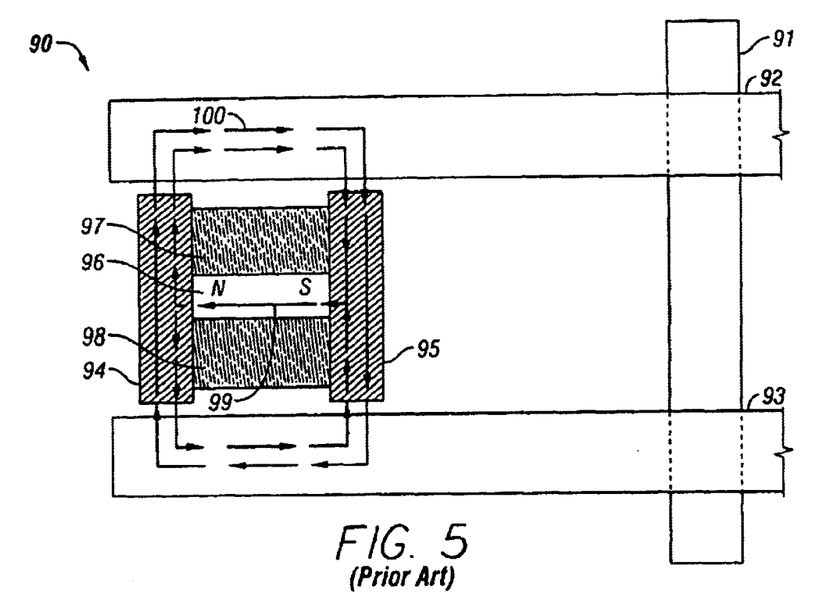
FIG. 5 is a schematic of a prior art magnetic bearing using permanent magnets for generation of bias flux with a non-coincident electromagnetic flux path and two rotating ferromagnetic thrust disks.

U.S. Pat. No. 3,955,858 discloses an improved thrust bearing design in which the permanent magnet is stationery. The configuration 90 is shown in FIG. 5. Two thrust disks 92 and 93 are attached to the shaft 91 and are acted upon by stator rings 94 and 95. A radially magnetized permanent magnet 96 generates the bias flux 99. The control flux 100 is generated by the control coils 97 and 98. As shown, superposition of the fluxes results in an upward force on the disks 92 and 93. The design unfortunately has a more complicated than desired construction, including a radially magnetized permanent magnet and two thrust disks. U.S. Pat. No. 5,315,197 describes the same configuration but also discloses a modified version, allowing for use of only one thrust disk. The drawback to this design is the inclusion of a radial airgap in the magnetic circuit. The radial airgap causes generation of radially destabilizing forces. A similar configuration, U.S. Pat. No. 5,514,924, adds multiple radial control coils to the same design.

U.S. Pat. No. 5,250,865 shows further improved thrust bearing configuration by only requiring one thrust disk and all permanent magnets are stationary. Unfortunately, the invention is complicated and requires use of four permanent magnets with eight airgaps. The bearing also requires assembly of multiple precision pieces for generation of the five flux paths.

More recently, U.S. Pat. No. 5,804,899 discloses a magnetic bearing with a biased thrust actuator. This invention is same thrust bearing as disclosed in U.S. Pat. No. 5,317,197 but only with a large structure added and some separate permanent providing some radial centering force. A radially magnetized permanent magnet and two thrust disk portions are again required.

There still exists a need for a high force, high efficiency magnetic thrust bearing that can allow for high speed rotation and also has a simple, low cost construction

SUMMARY OF THE INVENTION

The invention is an improved magnetic thrust bearing that uses permanent magnets to provide bias flux. The magnetic circuits of the control flux and bias fluxes are substantially non-coincident but they do share the same path over some portions which include axial airgaps. This allows for a low reluctance and efficient path for the electromagnets flux. The flux paths of the permanent magnets are completely defined with minimized airgaps for achieving higher forces and efficiency and very low control currents produce extremely large forces. The design uses a single coil and amplifier for simplicity and only a single thrust disk is required. Likewise, no radially magnetized permanent magnets are required and no permanent magnets are attached to the rotor that would require reinforcement.

Specifically the present invention is an electromagnetic bearing for a thrust member having a distal region extending outwardly from a support comprising: at least one ferrous member, such as an upper and lower yoke having a coil, the ferrous member straddles the distal region of the thrust member, confronting surfaces 123, 124, 125, 126 of at least two extrusions of the ferrous member and thrust member defining control flux air gaps on opposite sides of the thrust member, and generating an electromagnetic control flux path through the air gaps whereby to axially position the ferrous member relative to the thrust member; confronting surfaces 127, 128, 129, 130 of at least one permanent magnet and either the thrust member or the ferrous member, defining at least one magnetic air gap spaced from at least one of the control flux air gaps, and generating a bias flux path parallel and non-coincident with the control flux path for a substantial portion of its length, wherein the permanent magnet is outside the control flux path and the length of each air gap in said bearing is limited to the physical separation of the confronting surfaces.

These and other features, aspects, and advantages of the present invention will become better understood with regard to the following detailed description, appended claims, and accompanying drawings

DETAILED DESCRIPTION OF THE INVENTION

Figure 6:
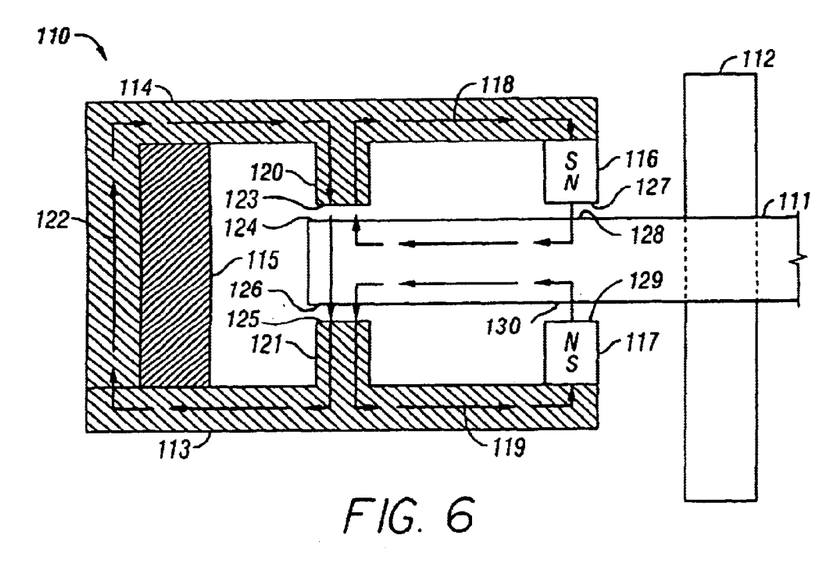
FIG. 6 is a schematic of a magnetic bearing of the present invention having a single rotating ferromagnetic thrust disk.

Turning to the drawings wherein like characters designate identical or corresponding parts, FIG. 6 shows a preferred configuration of the magnetic thrust bearing 10. A thrust disk 111 is attached to the shaft 112 and is acted upon by a lower yoke ring 113 and an upper yoke ring 114. A single coil 115 provides the control flux 122. An upper permanent magnet ring 116 provides the upper bias flux 118 and the lower permanent ring 117 provides the lower bias flux 119. The magnets 116 and 117 as well as the yokes 113 and 114 could be made as only a segment and not a complete ring. However, this would cause eddy currents in the thrust disk 111 during rotation so it is not desirable for rotating shaft applications.

The control flux 122 and bias fluxes 118 and 119 have substantially non-coincident paths but do share the same paths through the pole rings 120 and 121 and in the airgaps to the thrust disk 111. By superposition, as shown in FIG. 6, the control and upper bias flux 122, 118 subtract and the control and lower bias flux 122, 119 add. The result is a net force downward on the thrust disk 111. Reversing the current in the control coil 115, results in a net force upward. Because of the bias fluxes 118 and 119, the force generated is linear with the current in control coil 115. The force is also greatly amplified. The invention uses small airgaps in the bias flux paths and in the control flux path.

The low permeability permanent magnets are also not included in the electromagnetic flux path 122. Therefore, the bearing achieves maximum efficiency of force to applied control current. The bearing 110 works according to the following non-dimensionalized example. If the bias flux is 12 and a control flux of 8 is applied, the flux in the upper steel pole and airgap would be 20 and the flux in the lower steel pole and airgap would be 4. The force is proportion to the square of the flux density. Therefore the upward force exerted on the thrust disk would be (20^2−4^2) or 384. The force is linear with control current. However, if a control current is applied such that its flux becomes larger than the bias flux, the combined flux on one side of the thrust disk will become negative and hence start to attract the disk again. Designs with permanent magnets in series with the electromagnet such as FIG. 2 would be significantly less due to inability to generate large control fluxes. Likewise, designs like FIG. 3 with large airgaps in the bias flux path would also have significantly lower force per control current due to less bias flux. Accordingly with the invention, a digital signal processor and single amplifier, not shown, can provide control or an analog circuit could be employed. An axial position sensor such as an inductive proximity sensor, not shown, can provide feedback.

Figure 7:
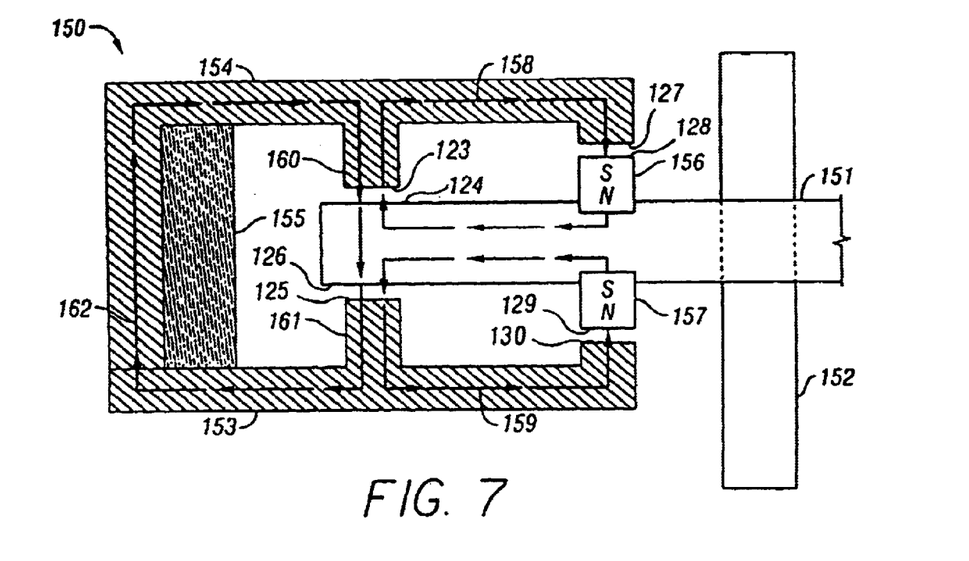
FIG. 7 is a schematic of a magnetic bearing of the present invention including rotating permanent magnets.

FIG. 7 shows a modified version of the invention. The thrust disk 151 is attached to the shaft 152 and is acted upon by the upper yoke ring 154 and lower yoke ring 153. The control coil 155 provides the control flux 162. The permanent magnets 156 and 157 for producing bias fluxes 158 and 159 are attached to the thrust disk 151. The operation of the bearing 150 is the same as before with superposition of the control and bias fluxes 162, 158 and 159. This design is however less favorable due to the rotating permanent magnets 156 and 157, which have low tensile strength.

Figure 8:
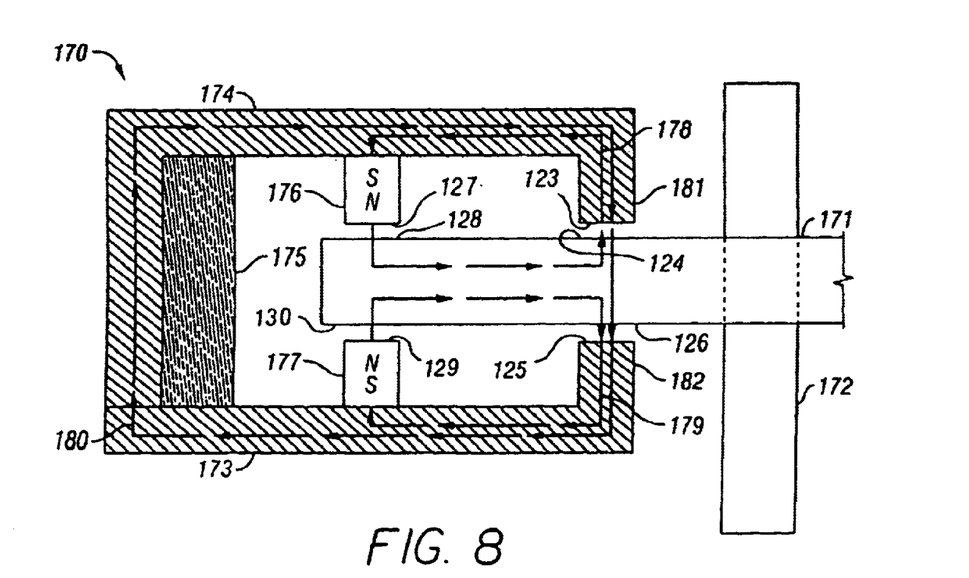
FIG. 8 is a schematic of a magnetic bearing as in FIG. 6 having reversed positions of the permanent magnet rings and ferromagnetic pole rings.

FIG. 8 shows an alternate version of the invention in which the placement of the permanent magnet rings and the steel pole rings are switched. In this configuration 170, the thrust disk 171 is attached to the shaft 172 and is acted upon by upper and lower yoke rings 173 and 174. A control coil 175 generates the control flux 180. Permanent magnet rings 176 and 177 generate the bias fluxes 178 and 179.

Figure 9:
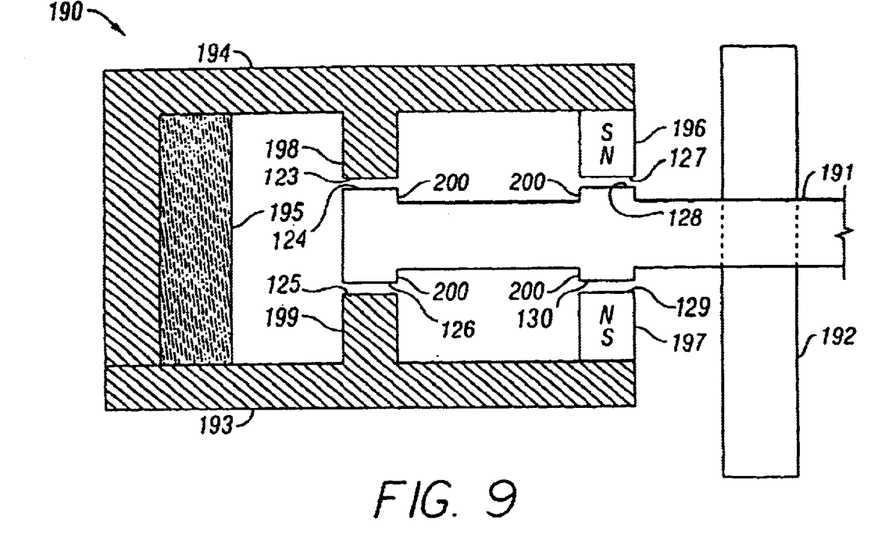
FIG. 9 is a schematic of a magnetic bearing of the present invention showing a thrust disk or member with raised poles or centering extrusions, which provide passive radial centering.

FIG. 9 shows an alternate version of the invention that provides passive radial centering force. In this configuration 190, the thrust disk 191 is attached to the shaft 192 and is again acted upon by the upper and lower ferromagnetic yoke rings 193 and 194. Permanent magnets 196 and 197 provide bias flux. To achieve a passive radial centering force, the thrust disk contains raised centering rings that line up with the steel yoke pole rings 198 and 199 and the permanent magnet rings 196 and 197. The rings will attempt to stay lined up as this is the position of minimum reluctance in the magnetic paths.

Figure 10:
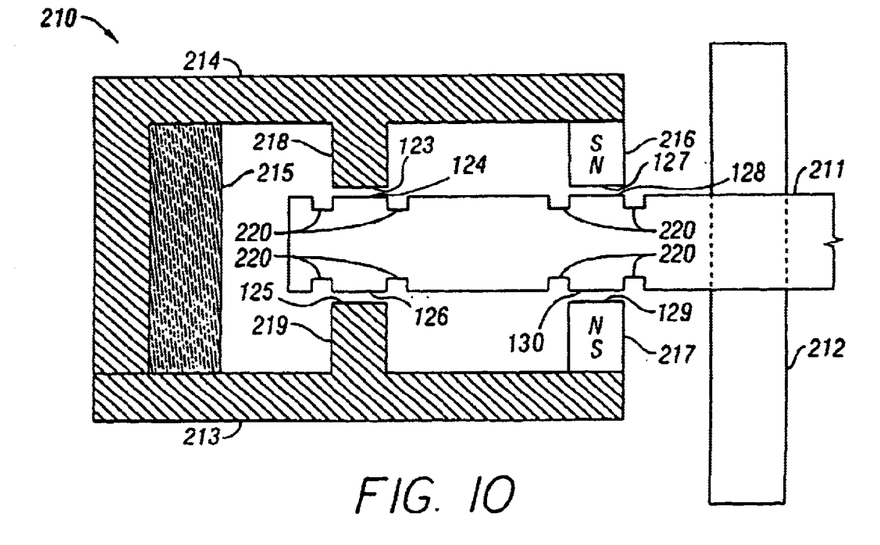
FIG. 10 is a schematic of a magnetic bearing of the present invention showing a thrust disk or member with circumferential grooves, which provide passive radial centering.

FIG. 10 shows a modified version of the design depicted in FIG. 9. In this configuration 210, the thrust disk 211 is attached to the shaft 212 and is acted upon by upper and lower yoke rings 213 and 214. The control coil 215 provides control flux and the permanent magnet rings 216 and 217 provide bias flux. In this design passive radial centering is achieved by cutting grooves 220 in to the thrust disk 211.

Figure 11:
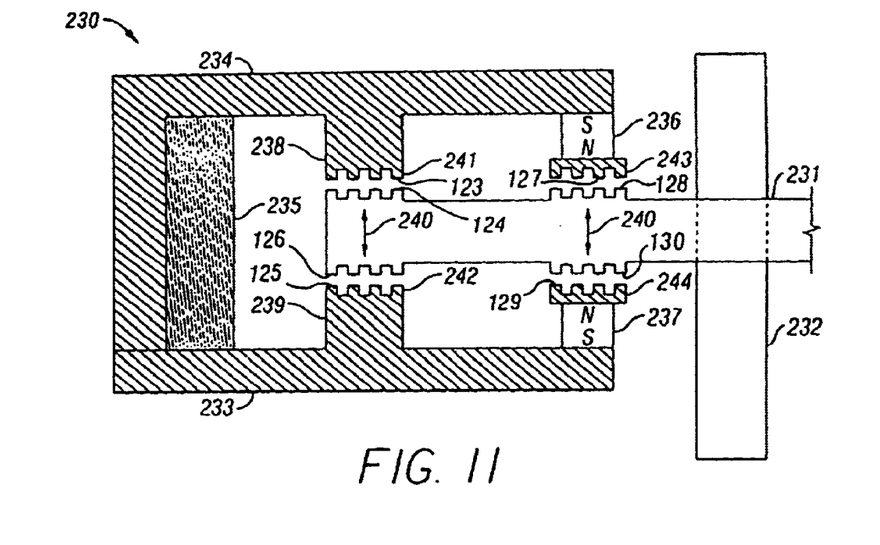
FIG. 11 is a schematic of a magnetic bearing of the present invention showing passive radial centering from teeth.

FIG. 11 shows an alternate version of the invention for providing maximum passive radial centering. In this configuration 230, the thrust disk 231 is attached to the shaft 232 and is acted upon by the upper and lower yoke rings 233 and 234. The control coil 235 provides control flux and the permanent magnets 236 and 237 provide the bias flux. Maximum passive radial centering force is achieved by cutting multiple teeth 240 into the thrust disk 231. These teeth try to stay aligned with matching teeth on the steel pole rings 238 and 239 and on magnet cap pieces 243 and 244. The teeth could alternately be cut into the magnet faces but this may result in cracking of the magnets due to being brittle.

Figure 12:
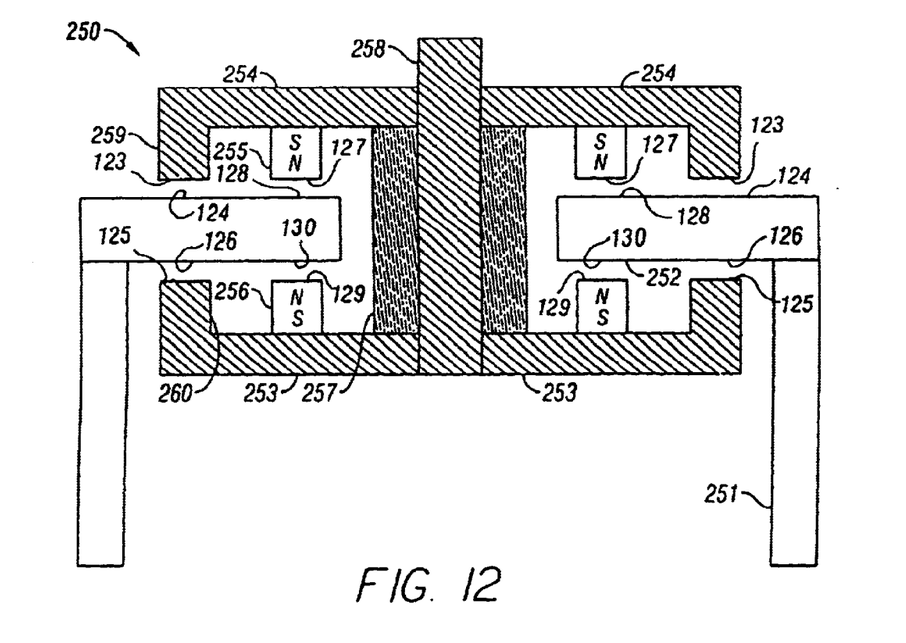
FIG. 12 is a schematic of a magnetic bearing invention alternate configuration with reversed radial positions of the rotor and stator.

FIG. 12 shows an alternate version of the same invention in which the stator portion is located in the center. In this configuration 250, the thrust disk 252 with central hole is attached to the rotating tube 251. The disk 252 is acted upon by upper and lower yokes 254 and 253. A control coil 257 is wound around the central ferrous shaft 258 which acts as a yoke. Permanent magnet rings 255 and 256 provide the bias flux. Yoke pole rings 259 and 260 provide paths for the combined control and bias fluxes.

Figure 13:
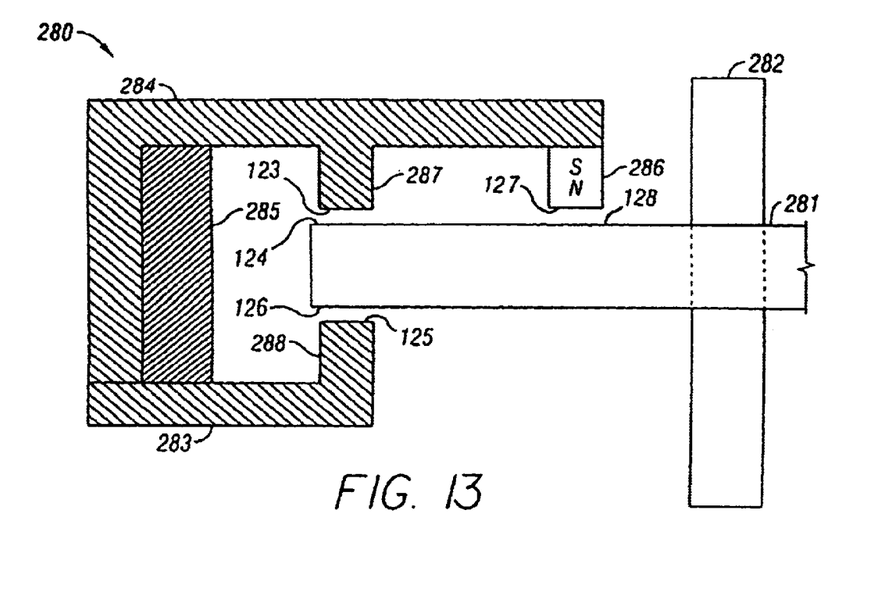
FIG. 13 is a schematic of a magnetic bearing invention alternate configuration with single permanent magnet ring.

FIG. 13 shows a version of the invention for providing primarily more force in one direction. In this configuration 280, the thrust disk 281 is attached to the shaft 282 and is acted upon by upper and lower yokes 284 and 283. A control coil 285 provides the control flux. An upper ring magnet 286 provides upper bias flux. The bearing 280 can exert forces both upward and downward but the maximum upward force capability is higher. Such a design may be useful in some applications to reduce size, cost or weight. Opposite actuators could also be used on opposite ends of the shaft 282.

Figure 14:
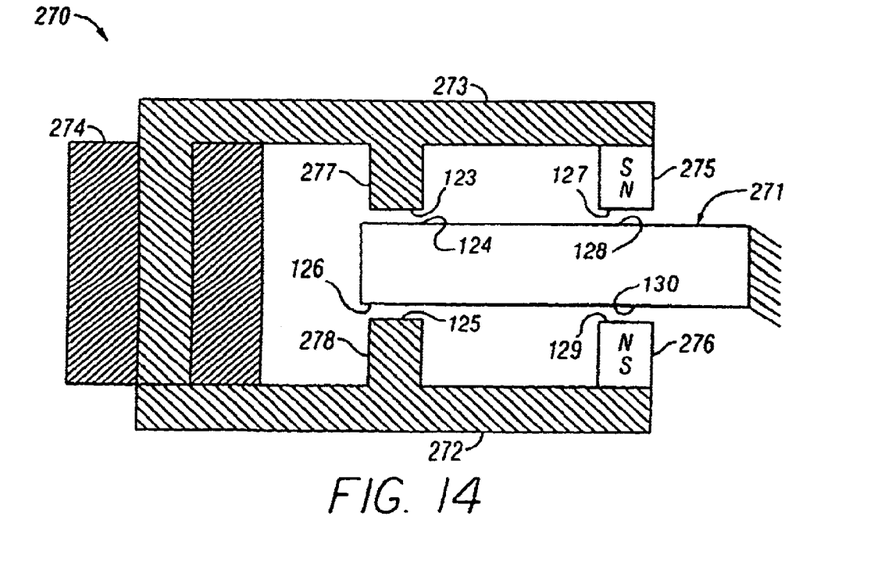
FIG. 14 is a schematic of a magnetic bearing invention alternate configuration for use as a translation bearing.

FIG. 14 shows an alternate version of the invention for use in linear bearing applications. In this configuration 270, the basic principle and design is the same except modified for linear motion. A linear ferromagnetic track 271 is fixed and the upper and lower yokes 272 and 273 move. A control coil 274 is wound around the ferrous member 272,273 and provides control flux and permanent magnet bars or cubes 275 and 276 provide the bias flux. The yoke poles 277 and 278 provide the path for the combined control and bias fluxes. Such a design could be useful for conveyors or magnetic levitation trains. The permanent magnets could also be replaced with superconductor magnets for generation of very high forces if required.

The following references are incorporated herein by reference: U.S. Pat. Nos. 3,937,148 and 5,003,211; U.S. Pat. No. 3,890,019; U.S. Pat. No. 3,865,442; U.S. Pat. No. 3,955,858; U.S. Pat. No. 5,315,197; U.S. Pat. No. 5,514,924; U.S. Pat. No. 5,250,865; and U.S. Pat. No. 5,804,899.

Although the foregoing invention has been described in some detail by way of illustration and example for purposes of clarity and understanding, it will be obvious that various modifications and changes which are within the knowledge of those skilled in the art are considered to fall within the scope of the appended claims.

What is claimed is:

1. An electromagnetic bearing for a thrust member having a distal region extending outwardly from a support comprising:
   at least one continuously magnetic ferrous member having a single coil, the ferrous member straddling the distal region of said thrust member, confronting surfaces of at least two extrusions of the ferrous member and thrust member defining a control flux air gap on opposite sides of the thrust member, and generating an electromagnetic control flux path through the air gap whereby to axially position the ferrous member relative to the thrust member; and
   confronting surfaces of at least one permanent magnet and either the thrust member or the ferrous member, defining at least one magnetic air gap spaced from at least one of the control flux air gap, and generating a bias flux path parallel and non-coincident with the control flux path for a substantial portion of its length, wherein the permanent magnet is outside the control flux path and the length of each air gap in said bearing is limited to the physical separation of the confronting surfaces.

2. The electromagnetic bearing as in claim 1, wherein the support is a rotating shaft.

3. The electromagnetic bearing as in claim 1, wherein the thrust member is rotatable.

4. The electromagnetic bearing as in claim 1, wherein the thrust member is a stationary linear rail.

5. The electromagnetic bearing as in claim 1, wherein the permanent magnet is a superconducting magnet.

6. The electromagnetic bearing as in claim 1, wherein the bias flux is generated by two permanent magnets on opposing sides of the ferrous member or on opposing sides of the thrust member.

7. The electromagnetic bearing as in claim 1, wherein the ferrous member straddles entirely the distal region of said thrust member.

8. The electromagnetic bearing as in claim 1, wherein the thrust member includes a plurality of centering extrusions, whereby at least two centering extrusions are opposite the extrusions of said thrust member.

9. The electromagnetic bearing as in claim 8, wherein the thrust member includes a centering extrusion opposite the permanent magnet.

* * * * *